(12) United States Patent
Nakamura

(10) Patent No.: US 11,306,977 B2
(45) Date of Patent: Apr. 19, 2022

(54) ROTARY FITTING

(71) Applicant: Yazaki Energy System Corporation, Tokyo (JP)

(72) Inventor: Takuju Nakamura, Tokyo (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 41 days.

(21) Appl. No.: 16/911,520

(22) Filed: Jun. 25, 2020

(65) Prior Publication Data

US 2020/0326137 A1 Oct. 15, 2020

Related U.S. Application Data

(63) Continuation of application No. PCT/JP2018/045329, filed on Dec. 10, 2018.

(30) Foreign Application Priority Data

Dec. 26, 2017 (JP) ............................. JP2017-248818

(51) Int. Cl.
*F28D 20/02* (2006.01)
*F28F 23/02* (2006.01)
*F28D 20/00* (2006.01)

(52) U.S. Cl.
CPC .............. *F28D 20/02* (2013.01); *F28F 23/02* (2013.01); *F28D 2020/0008* (2013.01); *F28D 2020/0073* (2013.01)

(58) Field of Classification Search
CPC ..... F28D 2020/0008; F28D 2020/0013; F28D 20/023; F28D 20/02; F28F 23/02
See application file for complete search history.

(56) References Cited

U.S. PATENT DOCUMENTS

| | | | | | |
|---|---|---|---|---|---|
| 3,925,945 | A | * | 12/1975 | White | E06B 3/2605 165/48.2 |
| 4,365,620 | A | * | 12/1982 | Bliamptis | E06B 3/40 126/633 |
| 5,398,446 | A | * | 3/1995 | Kunert | E06B 3/6715 49/169 |
| 6,319,599 | B1 | * | 11/2001 | Buckley | A41D 31/065 428/308.4 |
| 2008/0017352 | A1 | * | 1/2008 | Brower | F24F 5/0017 165/96 |

(Continued)

FOREIGN PATENT DOCUMENTS

| | | |
|---|---|---|
| CN | 106320951 A | 1/2017 |
| JP | 59-43856 U | 3/1984 |

(Continued)

*Primary Examiner* — Devon Russell

(74) *Attorney, Agent, or Firm* — Sughrue Mion, PLLC

(57) ABSTRACT

A pivot window includes a laminated body. The laminated body includes two sheets of a plate material; a peripheral end member provided at a peripheral end parts of the two sheets of the plate material; and a cell array plate material which is interposed between the two sheets of the plate material and which has a plurality of cells respectively having a gas phase and encapsulating a latent heat storage material having a melting point and a freezing point in a specific temperature range. The pivot window further includes a rotation mechanism for causing the laminated body to perform at least half rotation in a vertical direction.

5 Claims, 12 Drawing Sheets

(56) References Cited

U.S. PATENT DOCUMENTS

2015/0345874 A1    12/2015    Honda et al.

FOREIGN PATENT DOCUMENTS

| JP | 2002-130739 A |   | 5/2002 |
|----|---------------|---|--------|
| JP | 2007-131608 A |   | 5/2007 |
| JP | 2013-23977 A  |   | 2/2013 |
| JP | 2013023977 A  | * | 2/2013 |
| JP | 2016-6370 A   |   | 1/2016 |
| JP | 2016-30964 A  |   | 3/2016 |
| JP | 2016030964 A  | * | 3/2016 |

* cited by examiner

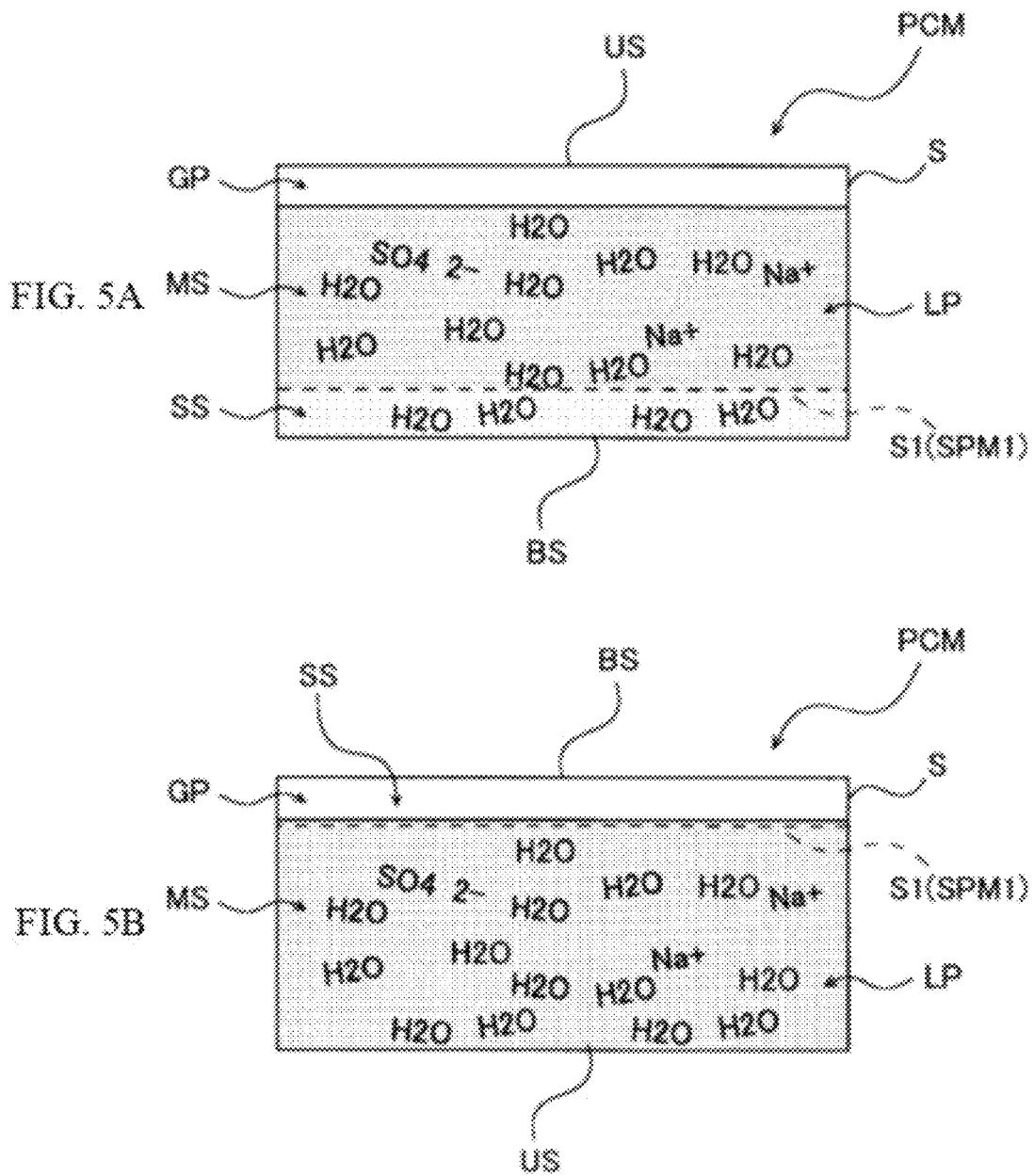

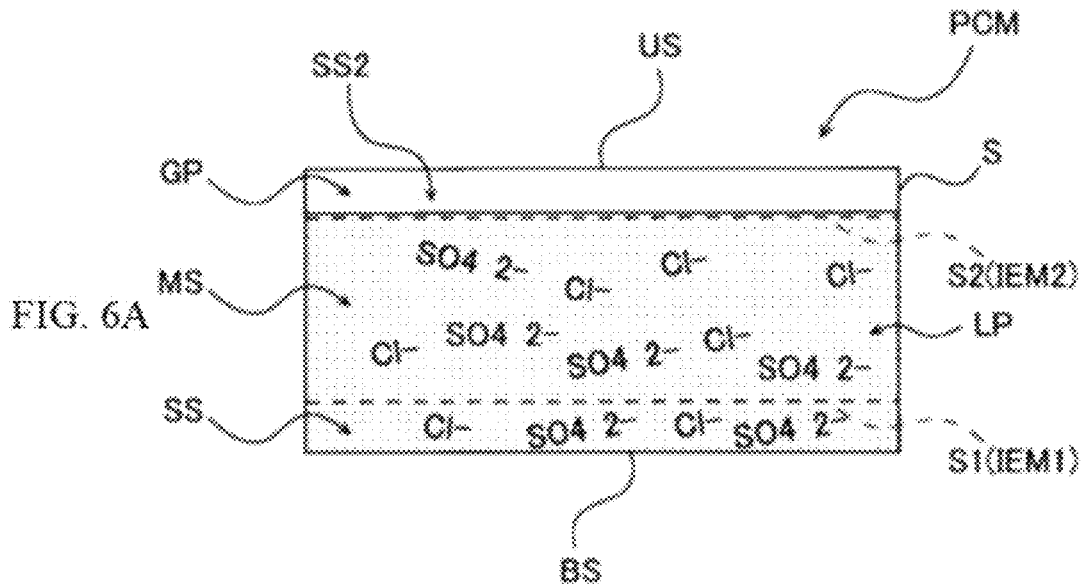
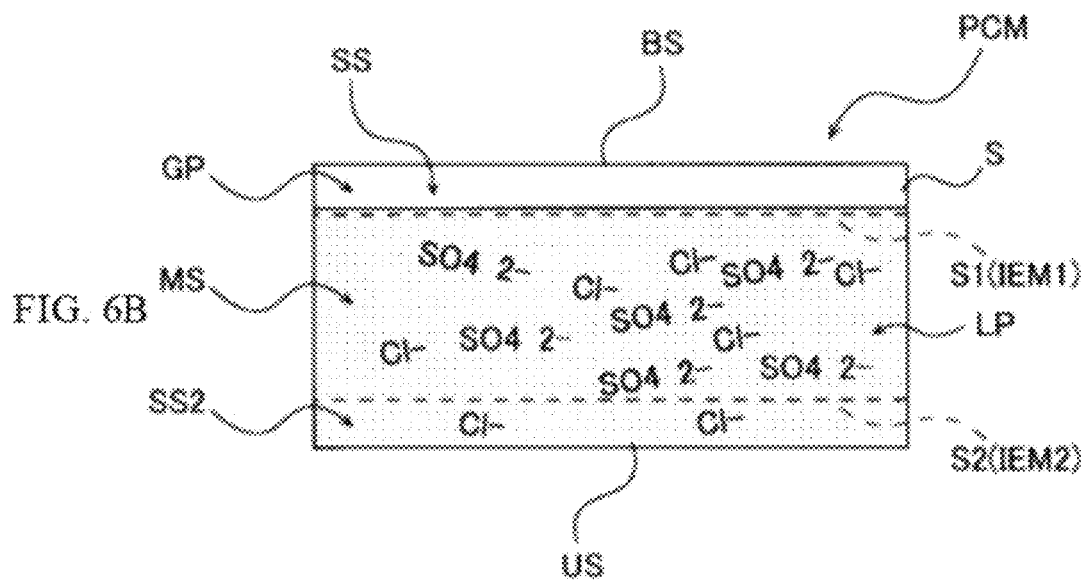

ROTARY FITTING

CROSS-REFERENCE TO RELATED APPLICATIONS

This is a continuation of International Application No. PCT/JP2018/045329 filed on Dec. 10, 2018, and claims priority from Japanese Patent Application No. 2017-248818 filed on Dec. 26, 2017, the entire content of which is incorporated herein by reference.

TECHNICAL FIELD

The present invention relates to a rotary fitting.

BACKGROUND ART

In a related art, proposed is a fitting including a rotary body having a heat storage layer on one face and a heat insulating layer on the other lace (refer to PTL 1). In this fitting, heat obtained from sunlight is stored in the heat storage layer by directing the heat storage layer to the outdoor side, after which the heat storage layer is directed to the indoor side, whereby the heat can be discharged from the heat storage layer into the indoor side while preventing radiation cooling from the indoor side by the heat insulating layer. In this fitting, a latent heat storage material may be used for the heat storage layer.

PTL1 is JP-A 2016-030964.

SUMMARY OF INVENTION

However, when the latent heat storage material is used for the heat storage layer in the fitting described in PTL 1, precipitate is generated by repeating solidification and melting of the latent heat storage material, which tends to cause deterioration in a heat storage amount.

Aspect of non-limiting embodiments of the present disclosure relates to provide a rotary fitting capable of suppressing deterioration in a heat storage amount due to generation of precipitate.

Aspects of certain non-limiting embodiments of the present disclosure address the features discussed above and/or other features not described above. However, aspects of the non-limiting embodiments are not required to address the above features, and aspects of the nonlimiting embodiments of the present disclosure may not address features described above.

According to an aspect of the present disclosure, there is provided a rotary fitting including a cell array plate material and a rotation mechanism. The cell array plate material includes a plurality of cells. Each cell encapsulates a latent heat storage material having a melting point and a freezing point in a specific temperature range. The rotation mechanism causes the cell array plate material to perform at least half rotation in a vertical direction.

According to the aspect, since a rotation mechanism for causing a cell array plate material to perform at least half rotation in a vertical direction is provided, even though precipitate is generated by repeating solidification and melting of a latent heat storage material, the precipitate can be broken by the rotation in the vertical direction, thereby making it possible to suppress deterioration in a heat storage amount due to the generation of the precipitate.

BRIEF DESCRIPTION OF DRAWINGS

Exemplary embodiment(s) of the present invention will be described in detail based on the following figures, wherein:

FIGS. 3A to 3D are schematic diagrams illustrating a latent heat storage material inside a cell, in which FIG. 3A illustrates a first state, FIG. 3B illustrates a second state, FIG. 3C illustrates a third state, and FIG. 3D illustrates a fourth state;

FIGS. 4A and 4B are first enlarged views illustrating one of a plurality of cells according to a second embodiment, in which FIG. 4A illustrates a non-rotated state and FIG. 4B illustrates a rotated state;

FIGS. 5A and 5B are second enlarged views illustrating one of the plurality of cells according to the second embodiment, in which FIG. 5A illustrates a non-rotated state and FIG. 5B illustrates a rotated state;

FIGS. 6A and 6B are first enlarged views illustrating one of a plurality of cells according to a third embodiment, in which FIG. 6A illustrates a non-rotated state and FIG. 6B illustrates a rotated state;

FIGS. 7A and 7B are second enlarged views illustrating one of the plurality of cells according to the third embodiment, in which FIG. 7A illustrates a non-rotated state and FIG. 7B illustrates a rotated state;

FIGS. 8A and 8B are first enlarged views illustrating one of a plurality of cells according to a fourth embodiment, in which FIG. 8A illustrates a non-rotated state and FIG. 8B illustrates a rotated state;

FIGS. 9A and 9B are second enlarged views illustrating one of the plurality of cells according to the fourth embodiment, in which FIG. 9A illustrates a non-rotated state and FIG. 9B illustrates a rotated state;

DESCRIPTION OF EMBODIMENTS

Hereinafter, the present invention will be described with reference to preferred embodiments. The present invention is not limited to the embodiments described below, and can be appropriately modified within a range not departing from the spirit of the present invention. In the embodiments described below, there may be a portion in which a part of configuration will not be illustrated and description thereof will be omitted, but with respect to details of an omitted technology, it goes without saying that a publicly known or well-known technology is appropriately applied within a range not causing inconsistency with a content described below.

Figure 1:
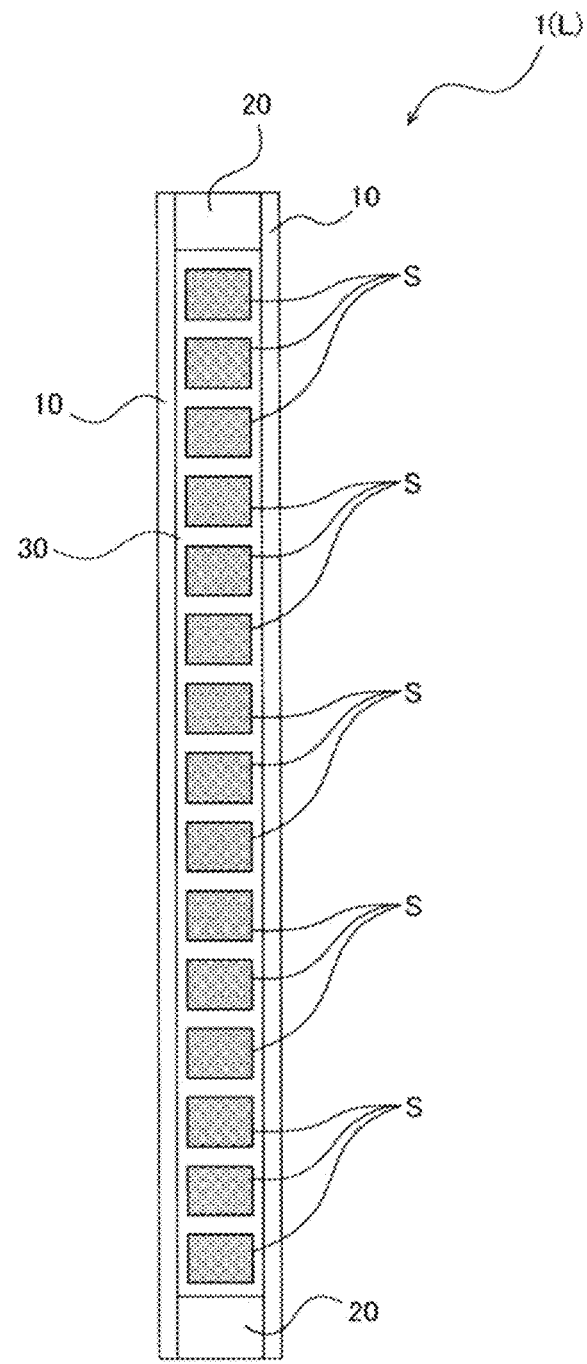
FIG. 1 is a cross-sectional view illustrating a pivot window according to a first embodiment of the present invention.

FIG. 1 is a cross-sectional view illustrating a pivot window according to a first embodiment of the present invention. Hereinafter, the pivot window applicable as a window (regardless of whether the window is opened or closed) will be described as an example of a rotary fitting, and the rotary fitting is not limited to the one applied to the pivot window, but may be a rotating outer wall material.

A pivot window 1 according to the example illustrated in FIG. 1 schematically includes two sheets of a plate material 10, a peripheral end member 20, and a cell array plate material 30.

The two sheets of the plate material 10 are transparent plate materials disposed almost in parallel with each other. For example, these plate materials 10 are configured of a glass material. The peripheral end member 20 is interposed between the two sheets of the plate material 10 at peripheral end parts of the two sheets of the plate material 10. An internal space closed by the two sheets of the plate material 10 and the peripheral end member 20 is formed by providing the peripheral end member 20 at the peripheral end parts of the two sheets of the plate material 10.

The cell array plate material 30 is provided in the internal space formed by the two sheets of the plate material 10 and the peripheral end member 20. The cell array plate material 30 is a plate material in which a plurality of gap portions serving as a plurality of cells S are arranged in a vertical direction. A transparent latent heat storage material is encapsulated in each cell S. The latent heat storage material is configured of, for example, inorganic salt hydrate (Na$_2$SO$_4$10H$_2$O and CaCl$_2$6H$_2$O), and has a melting point and a freezing point in a specific temperature range (for example, 21° C.).

In the embodiment, the cell array plate material 30 is a ladder-shaped cross-section material in which the cells S are disposed in a line in the vertical direction, but is not limited thereto, and a honeycomb cross-section material in which the gap portions serving as the cells are arranged in a honeycomb shape vertically and horizontally may be adopted. That is, the cell array plate material 30 is not limited to the above-described material as long as the latent heat storage material can be held.

Figure 2:
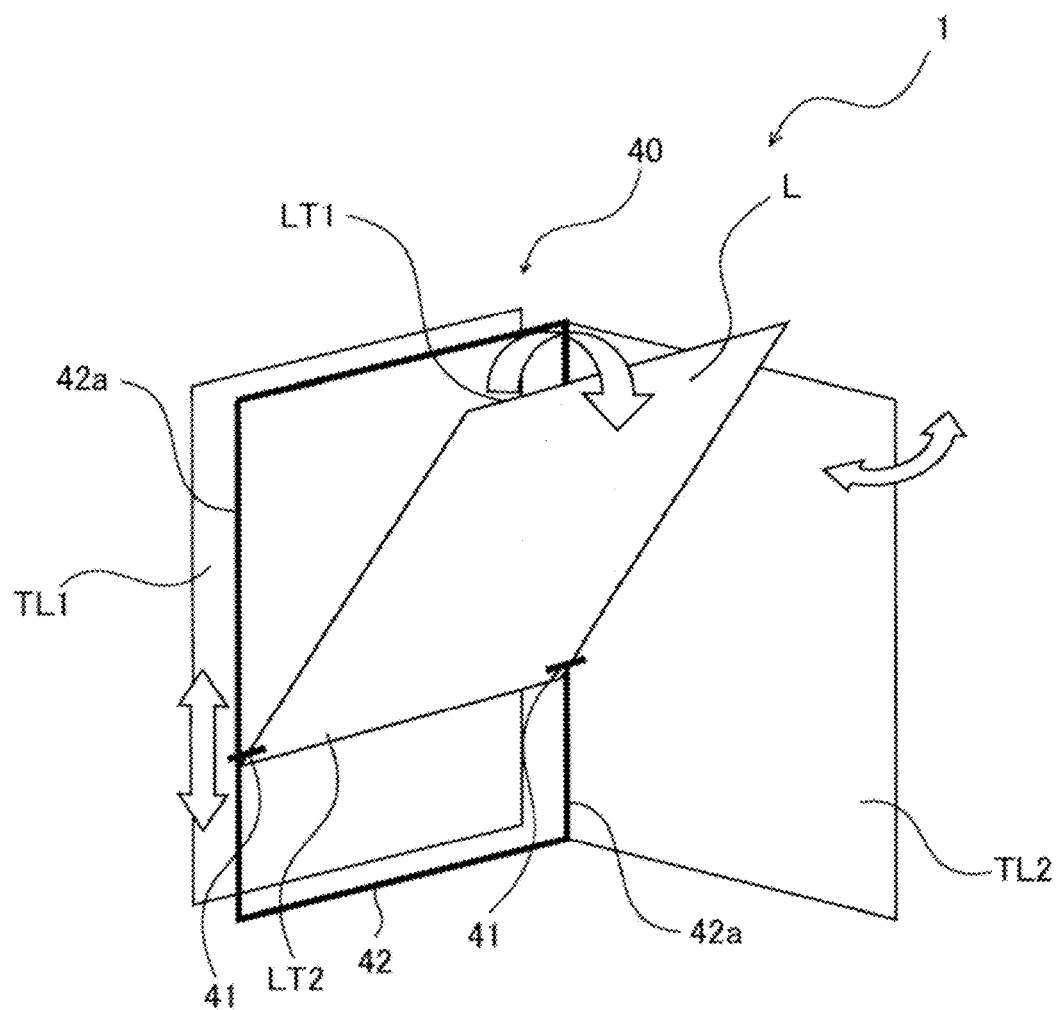
FIG. 2 is a perspective view illustrating the pivot window according to the first embodiment, and illustrates a rotation mechanism.

FIG. 2 is a perspective view illustrating the pivot window 1 according to the first embodiment, and illustrates a rotation mechanism. In the following description, a configuration of the pivot window 1 excluding a rotation mechanism 40 (two sheets of the plate material 10, peripheral end member 20, and cell array plate material 30) is referred to as a laminated body L.

As illustrated in FIG. 2, the pivot window 1 includes a transparent louver TL1 also referred to as a jalousie window on the outdoor side of the laminated body L. The pivot window 1 includes an indoor louver TL2 on the indoor side of the laminated body L. The pivot window 1 according to the first embodiment includes the rotation mechanism 40. The rotation mechanism 40 includes a pivot 41, a window frame 42, and a lock unit which is not illustrated, and the laminated body L can be half rotated without contacting the louvers TL1 and TL2.

More specifically, the pivot 41 is a rotary shaft member provided at any one of upper and lower end parts LT2 of the laminated body L. The above-described pivots 41 are respectively provided on the left and right sides of the laminated body L. The laminated body L is fitted to the window frame 42, and the laminated body L fitted to the window frame 42 is in a locked state in which a fitted state is maintained by the lock unit which is not illustrated. The pivot 41 is slidable with respect to left and right members 42a of the window frame 42. The indoor louver TL2 can be opened and closed in an indoor direction.

According to the above-described configuration, a rotation operation can be performed as follows. First, it is assumed that the pivot 41 is located at a lower end of the window frame 42. From this state, the indoor louver TL2 is opened. Next, the lock unit is released, and an end part LT1 of the laminated body L on the side where the pivot 41 is not provided is pulled out to the indoor side. Next, an end part LT2 of the laminated body L on the side of the pivot 41 is slid upward with respect to the window frame 42. Thereafter, when the end part LT2 of the laminated body L reaches an upper end of the window frame 42, the laminated body L is fitted to the window frame 42 and locked by the lock unit. Finally, the indoor louver TL2 is closed.

Figure 3B:
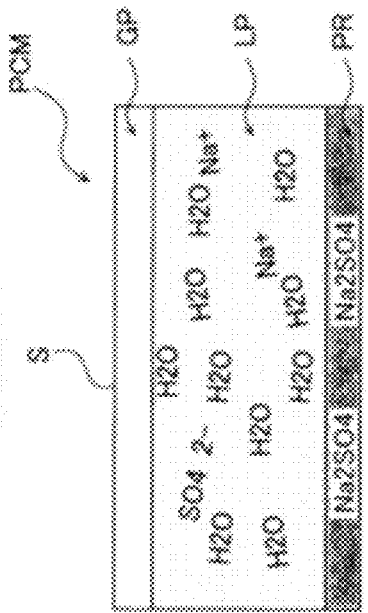
Figure 3D:
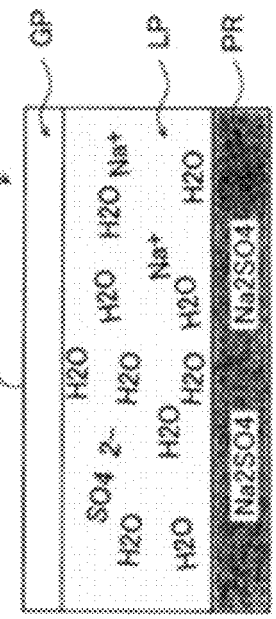
Figure 3A:
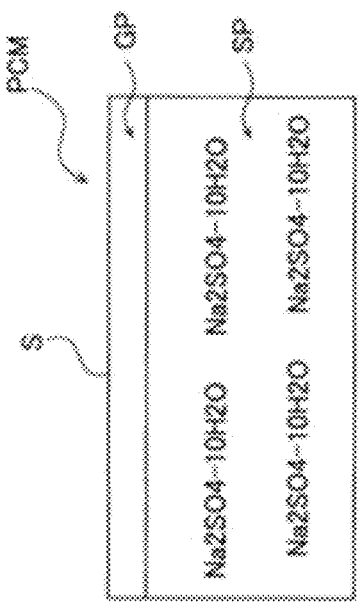
Figure 3C:
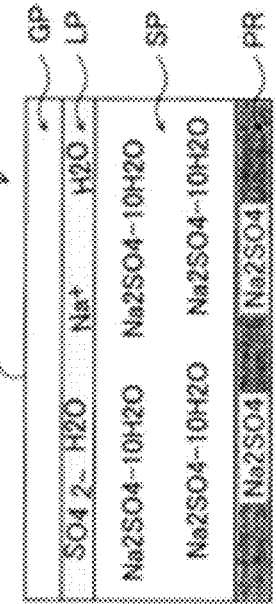

Next, function of the pivot window 1 according to the first embodiment will be described with reference to FIGS. 3A to 3D. FIGS. 3A to 3D are schematic diagrams illustrating the latent heat storage material inside the cell S, in which FIG. 3A illustrates a first state, FIG. 3B illustrates a second state, FIG. 3C illustrates a third state, and FIG. 3D illustrates a fourth state.

First, the first state is assumed as illustrated in FIG. 3A. In the first state, since an ambient temperature is low (below a freezing point), a latent heat storage material PCM is in a solid phase SP. Inorganic salt hydrate (Na$_2$SO$_4$10H$_2$O) is used for the latent heat storage material PCM. A gas phase GP is provided in the cell S so as to cope with a change in the volume of the latent heat storage material PCM. When the cell S itself is made of resin and can absorb some expansion, the cell S may not have the gas phase GP.

Thereafter, when the ambient temperature rises, the state shifts to the second state. That is, as illustrated in FIG. 3B, the latent heat storage material PCM is inconsistently melted into an anhydride and an aqueous solution at a decomposition melting point to form a liquid phase LP, and at that time, a lower hydrate and the anhydride are partially precipitated to generate a precipitate PR. As a result, in the cell S, the gas phase GP, the liquid phase LP, and the precipitate PR are sequentially laminated from the top.

Next, when the ambient temperature becomes lower, the state shifts to the third state. That is, as illustrated in FIG. 3C, the latent heat storage material PCM starts a hydration reaction at a peritectic point (approximately coincides with the decomposition melting point), but since the hydration reaction from the lower hydrate and the anhydride to the higher hydrate proceeds in the solid phase SP, a reaction rate is slow, and a precipitate layer of the higher hydrate is formed at an upper part of the solid phase SP before the hydration reaction is completed. Therefore, the movement of water from the aqueous solution on the upper part side is prevented, and thus the reaction is terminated. As a result, the gas phase GP, the liquid phase LP, the solid phase SP, and the precipitate PR are sequentially laminated from the top.

Thereafter, when the ambient temperature rises, the state shifts to the fourth state. At this time, the precipitate PR is further generated in the same manner when the state shifts from the first state to the second state (refer to FIG. 3D). As described above, the precipitate PR increases by repeating solidification and melting, which causes deterioration in a heat storage amount.

Meanwhile, the pivot window 1 according to the first embodiment includes, for example, the rotation mechanism 40 illustrated in FIG. 2, and can rotate the laminated body L in the vertical direction. Therefore, when the rotation mechanism 40 is used to perform half rotation in the vertical direction, the precipitate PR can be broken. Therefore, the deterioration in the heat storage amount due to the increase in the precipitate PR is suppressed.

As described above, according to the pivot window 1 according to the first embodiment, since the rotation mechanism 40 for causing the cell array plate material 30 to perform at least half rotation in the vertical direction is provided, the precipitate PR can be broken by the rotation in the vertical direction even though the precipitate PR is generated by repeating the solidification and the melting of the latent heat storage material PCM. Therefore, according to the pivot window 1 of the first embodiment, it is possible to suppress the deterioration in the heat storage amount due to the generation of the precipitate PR.

Next, a second embodiment of the present invention will be described. A pivot window according to the second embodiment has the following configuration. Hereinafter, in the description of the second embodiment, the same or similar elements as those of the first embodiment will be denoted by the same reference signs.

Figure 4A:
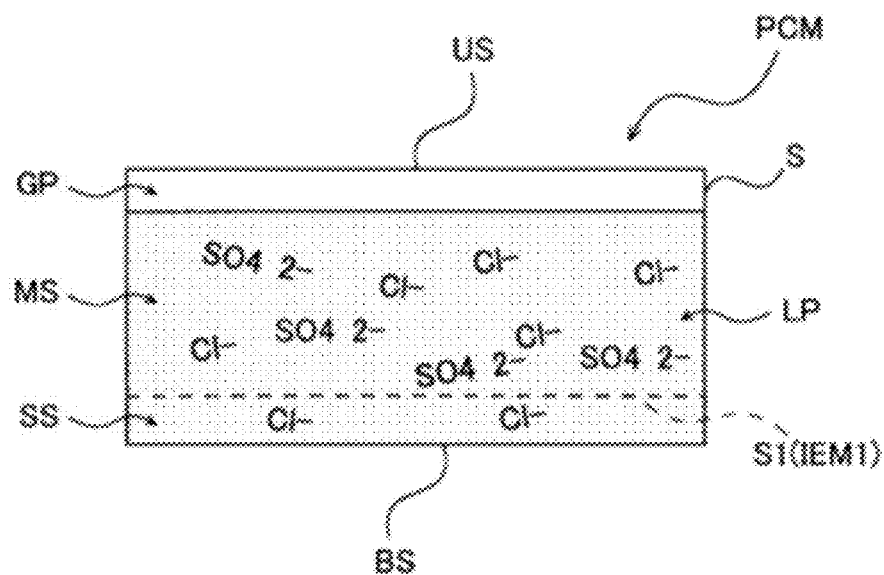
Figure 4B:
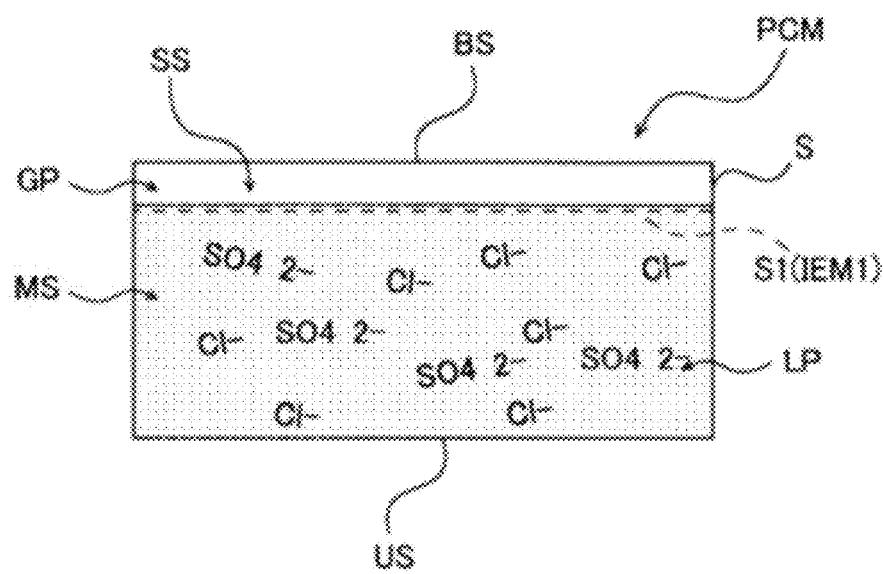

FIGS. 4A, 4B, 5A, and 5B are enlarged views illustrating one of the plurality of cells S according to the second embodiment, in which FIGS. 4A and 5A illustrate a non-rotated state and FIGS. 4B and 5B illustrate a rotated state. As illustrated in FIG. 4A, a membrane member (uneven distribution unit) S1 is provided inside the cell S. The membrane member S1 is an ion exchange membrane (uneven distribution unit, membrane member) IEM1 that causes a permeation speed of a specific ion and that of another ion to be different from each other. As illustrated in FIG. 5A, the membrane member S1 may be configured of a semipermeable membrane (uneven distribution unit, membrane member) SPM1 that causes a permeation speed of the ion and that of water to be different from each other.

Here, the membrane member S1 is provided at a position separated in a height direction in the cell S. More specifically, the membrane member S1 is provided at a position close to an upper face US (or lower face BS) of the cell S, and partitions the inside of the cell S into a small space SS and a main space MS. As illustrated in FIGS. 4B and 5B, even though the laminated body L is half rotated in the vertical direction by the rotation mechanism 40, the membrane member S1 is provided at a position where the membrane member S1 remains immersed when the latent heat storage material PCM is in the liquid state.

Next, function of the pivot window 1 according to the second embodiment will be described with reference to FIGS. 4A and 4B. In the example illustrated in FIG. 4, the latent heat storage material PCM has three components of $Na_2SO_4$, NaCl, and water, and specifically, is a eutectic crystal type·eutectic type heat storage material in which NaCl which is a freezing point depressant is added to $Na_2SO_4 \cdot 10H_2O$.

First, in the winter, the cell S is oriented as illustrated in FIG. 4A. That is, the ion exchange membrane IEM1 is located on the lower side. Here, the ion exchange membrane IEM1 is, for example, a monovalent ion selective permeable anion exchange membrane. Therefore, a chlorine ion and water can permeate the ion exchange membrane IEM1, and the chlorine ion and the water are located in the small space SS. Therefore, sodium sulfate (specific component) is unevenly distributed in the main space MS, and thus in the main space MS, the concentration of the freezing point depressant becomes relatively low with respect to the latent heat storage material PCM. Here, in the heat storage material referred to as the eutectic crystal type·eutectic type, a freezing point depression degree is affected by, the concentration of the freezing point depressant (second component of the eutectic crystal type·eutectic type) with respect to the heat storage material (first component of the eutectic crystal type·eutectic type). From this point, the freezing point of the latent heat storage material PCM in the cell S can be increased, for example, to about 26° C., thereby making it possible to obtain a latent heat storage window for the winter that provides a temperature control effect of heating the indoor side.

On the other hand, for example, in the summer, the laminated body L is half rotated in the vertical direction by using the rotation mechanism 40 as illustrated in FIG. 2 while maintaining the left and right positions of the laminated body L. In this case, the result is shown as illustrated in FIG. 4B. That is, most of the small space SS becomes the gas phase GP. Most of the chlorine ion and the water existing in the small space SS in FIG. 4A shift to the main space MS. As a result, the concentration of the freezing point depressant in the main space MS becomes relatively high with respect to the latent heat storage material PCM. Here, in the heat storage material referred to as the eutectic crystal type·eutectic type, since the freezing point depression degree is affected by the concentration of the freezing point depressant with respect to the heat storage material, the freezing point of the latent heat storage material PCM in the cell S can be lowered to, for example, about 18° C., thereby making it possible to obtain a latent heat storage window for the summer that provides a temperature control effect of cooling the indoor side.

Function of the pivot window 1 according to the second embodiment will be described with reference to FIGS. 5A and 5B. In the example illustrated in FIGS. 5A and 5B, the latent heat storage material PCM has two components of $Na_2SO_4 \cdot 10H_2O$ and excess water, and more specifically, is an aqueous solution of $Na_2SO_4 \cdot 10H_2O$ (heat storage material of dissolution precipitation type). In addition thereto, NaCl which is the freezing point depressant may be added thereto.

First, in the winter, the cell S is oriented as illustrated in FIG. 5A. That is, the semipermeable membrane SPM1 is in a state of being located on the lower side. Here, since the semipermeable membrane SPM1 has a significantly low ion permeation speed, water is located in the small space SS, and the sodium sulfate is unevenly distributed in the main space MS, thereby increasing its concentration. Here, since a freezing point of the heat storage material of the dissolution precipitation type increases as water concentration increases, the freezing point of the latent heat storage material PCM in the cell S can be increased to, for example, about 26° C., thereby making it possible to obtain the latent heat storage window for the winter that provides the temperature control effect of heating the indoor side.

On the other hand, in the summer, the laminated body L is half rotated in the vertical direction by using the rotation mechanism 40 as illustrated in FIG. 2 while maintaining the left and right positions of the laminated body L. In this case, the result is shown as illustrated in FIG. 5B. That is, most of the small space SS becomes the gas phase GP. Most of the water existing in the small space SS in FIG. 5A shifts to the main space MS. As a result, the water content in the main space MS increases, and thus the concentration of the sodium sulfate becomes lowered. Here, since the freezing point of the heat storage material of the dissolution precipitation type is lowered as the water concentration is lowered, the freezing point of the latent heat storage material PCM in the cell S can be lowered to, for example, about 18° C., thereby making it possible to obtain the latent heat storage window for the summer that provides the temperature control effect of cooling the indoor side.

As described above, according to the pivot window 1 according to the second embodiment, in the same manner as that of the first embodiment, it is possible to suppress the deterioration in the heat storage amount due to the generation of the precipitate PR.

According to the second embodiment, since the membrane member S1 for unevenly distributing the specific component is provided, an uneven distribution state of the component can be caused to be different before and after the half rotation in the vertical direction, thereby making it possible to change the melting point and the freezing point of the latent heat storage material PCM.

In the plurality of cells S, the membrane member S1 is provided at a position biased in the height direction, thereby separating the inside into the small space SS and the main space MS. Therefore, the concentrations of the freezing point depressant and the latent heat storage material PCM on the upper and lower sides of the membrane member S1 are changed by the vertical rotation, thereby making it possible to change the melting point and the freezing point of the latent heat storage material PCM.

Next, a third embodiment of the present invention will be described. A pivot window according to the third embodiment has the following configuration. Hereinafter, in the description of the third embodiment, the same or similar elements as those of the second embodiment will be denoted by the same reference signs.

Figure 7A:
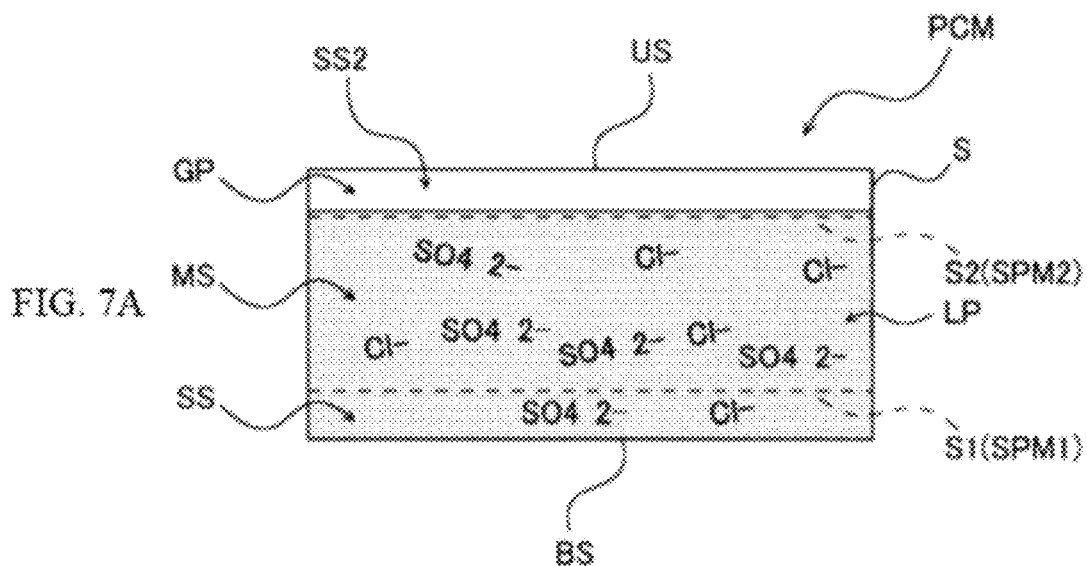
Figure 7B:
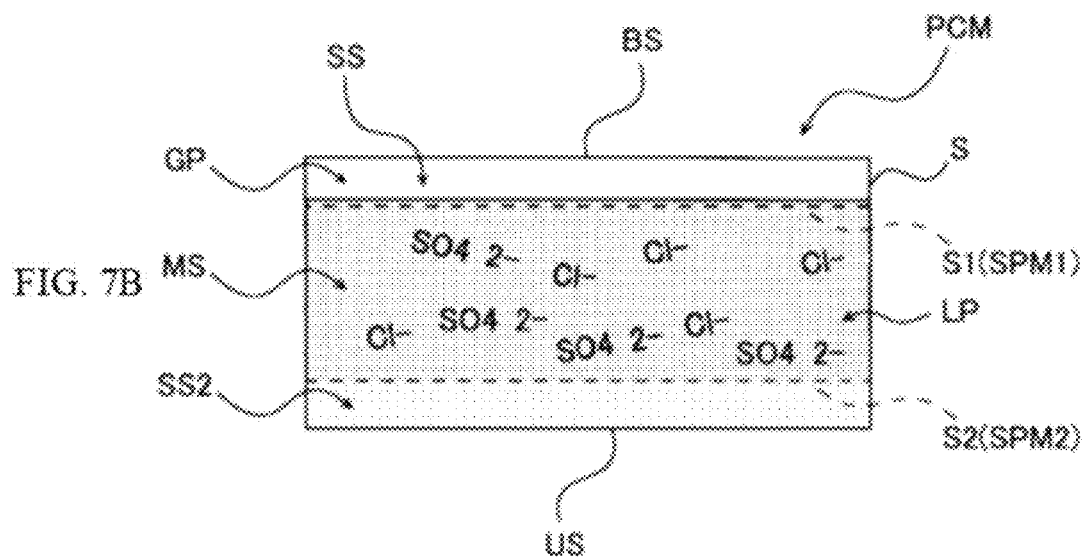

FIGS. 6A, 6B, 7A and 7B are enlarged views illustrating one of the plurality of cells S according to the third embodiment, in which FIGS. 6A and 7A illustrate a non-rotated state and FIGS. 6B and 7B illustrate a rotated state. As illustrated in FIG. 6A, a second membrane member (uneven distribution unit) S2 is further provided inside the cell S. The second membrane member S2 is the same as the membrane member S1, is a second ion exchange membrane (uneven distribution unit, second membrane member) IEM2 in the example illustrated in FIGS. 6A and 6B, and is a second semipermeable membrane (uneven distribution unit, second membrane member) SPM2 in the example illustrated in FIGS. 7A and 7B.

The second membrane member S2 forms a second small space SS2 almost symmetrical to the small space SS formed by the membrane member S1 in the height direction. That is, when the small space SS is provided at a position close to the lower face BS of the cell S, the second membrane member S2 is provided at a position close to the upper face US of the cell S, and the volume of the small space SS is almost the same as the volume of the second small space SS2. Accordingly, in the same manner as that of the membrane member S1, the second membrane member S2 remains immersed when the latent heat storage material PCM is in the liquid state even though the laminated body L is half rotated in the vertical direction by the rotation mechanism 40.

Next, function of the pivot window 1 according to the third embodiment will be described with reference to FIGS. 6A and 6B. In the example illustrated in FIG. 6, the latent heat storage material PCM has three components of $Na_2SO_4$, NaCl, and water, and specifically, is a eutectic crystal type·eutectic type heat storage material in which NaCl which is the freezing point depressant is added to $Na_2SO_4 \cdot 10H_2O$. In the example illustrated in FIGS. 6A and 6B, the membrane member S1 and the second membrane member S2 are the ion exchange membranes IEM1 and IEM2 (monovalent ion selective permeable anion exchange membranes) that causes a permeation speed of a specific ion and that of another ion to be different from each other.

First, as illustrated in FIG. 6A, it is assumed that the ion exchange membrane IEM1 is located below the second ion exchange membrane IEM2. In this case, the chlorine ion exists in the main space MS and the small space SS, and a sulfate ion should exist only in the main space MS. However, when the sulfate ion is left for a long time in the state illustrated in FIG. 6A, the sulfate ion also passes through the ion exchange membrane IEM1 and moves to the small space SS. Therefore, the main space MS and the small space SS have almost the same composition.

Then, when the rotation mechanism 40 is used to perform half rotation in the vertical direction, the result is shown as illustrated in FIG. 6B. In this case, the chlorine ion and the water permeate the ion exchange membrane IEM1 and move to the main space MS. On the other hand, the sulfate ion should be difficult to permeate the ion exchange membrane IEM1 in principle, but since the volume of the aqueous solution in the small space SS is dramatically reduced, the concentration of the sulfate ion in the small space SS unexpectedly appears and increases, such that the sulfate ion also flows out into the main space MS at a suitable speed.

The water and the chlorine ion flow out from the main space MS to the second small space SS2. With respect to the sulfate ion in the main space MS, since a concentration difference of the sulfate ion between the main space MS and the second small space SS2 is not significant, the sulfate ion hardly permeates the second ion exchange membrane IEM2. As a result, the sodium sulfate is in a state of being unevenly distributed in the main space MS, such that the concentration of the freezing point depressant in the main space MS becomes relatively high with respect to the latent heat storage material PCM.

Here, in the heat storage material referred to as the eutectic crystal type·eutectic type, since the freezing point depression degree is affected by the concentration of the freezing point depressant with respect to the heat storage material, in the same manner as that of the state illustrated in FIG. 4A, the state illustrated in FIG. 6B can be used as the latent heat storage window for the winter that provides the temperature control effect of heating the indoor side.

Next, function of the pivot window 1 according to the third embodiment will be described with reference to FIGS. 7A and 7B. In the example illustrated in FIGS. 7A and 7B, the latent heat storage material PCM has three components of $Na_2SO_4$, NaCl, and water, and specifically, is obtained by adding NaCl which is the freezing point depressant to $Na_2SO_4 \cdot 10H_2O$ (heat storage material of dissolution precipitation type).

First, as illustrated in FIG. 7A, it is assumed that the semipermeable membrane SPM1 is located below the second semipermeable membrane SPM2. In this case, the water exists in the small space SS, and the chlorine ion and the sulfate ion should exist only in the main space MS. However, when the chlorine ion and the sulfate ion are left for a long time in the state illustrated in FIG. 7A, the chlorine ion and the sulfate ion also permeate the semipermeable membrane SPM1 and move to the small space SS. Therefore, the main space MS and the small space SS have almost the same composition.

Then, when the rotation mechanism 40 is used to perform half rotation in the vertical direction, the result is shown as illustrated in FIG. 7B. In this case, the water permeates the semipermeable membrane SPM1 and moves to the main space MS. On the other hand, the chlorine ion and the sulfate ion should be difficult to permeate the semipermeable membrane SPM1 in principle, but since the volume of the aqueous solution in the small space SS is dramatically reduced, the concentrations of the chlorine ion and the sulfate ion in the small space SS are significantly increased, such that the chlorine ion and the sulfate ion flow out into the main space MS at a suitable speed.

The water flows out from the main space MS to the second small space SS2. With respect to the chlorine ion and the sulfate ion in the main space MS, since a concentration difference of the chlorine ion and a concentration difference of the sulfate ion between the main space MS and the second small space SS2 are not significant, the chlorine ion and the sulfate ion hardly permeate the second semipermeable membrane SPM2. As a result, the sodium sulfate is unevenly distributed in the main space MS.

Here, since the freezing point of the heat storage material of the dissolution precipitation type increases as the water concentration increases, in the same manner as that of the state illustrated in FIG. 5A, the state illustrated in FIG. 7B can be the latent heat storage window for the winter that provides the temperature control effect of beating the indoor side.

As described above, according to the pivot window 1 according to the third embodiment, in the same manner as that of the second embodiment, it is possible to suppress the deterioration in the heat storage amount due to the generation of the precipitate PR. According to the pivot window 1 of the third embodiment, the concentrations of the freezing point depressant and the latent heat storage material PCM above and below the membrane member S1 are changed, thereby making it possible to change the melting point and the freezing point of the latent heat storage material PCM.

According to the third embodiment, since the second membrane member S2 for unevenly distributing the specific component is provided, an uneven distribution state of the component can be caused to be different before and after the half rotation in the vertical direction, thereby making it possible to change the melting point and the freezing point of the latent heat storage material PCM.

The pivot window 1 according to the third embodiment further includes the second membrane member S2 that forms the second small space SS2 almost symmetrical to the small space SS in the height direction, and the second membrane member S2 is configured of the same material as that of the membrane member S1. Therefore, for example, even when the inside of the cell S becomes the same component across the membrane member S1 by leaving the cell S for a long period of time, the concentrations of the freezing point depressant and the latent heat storage material above and below the second membrane member S2 are changed by the vertical rotation, thereby making it possible to change the melting point and the freezing point of the latent heat storage material.

Next, a fourth embodiment of the present invention will be described. A pivot window according to the fourth embodiment has the following configuration. Hereinafter, in the description of the fourth embodiment, the same or similar elements as those of the first embodiment will be denoted by the same reference signs.

Figure 8A:
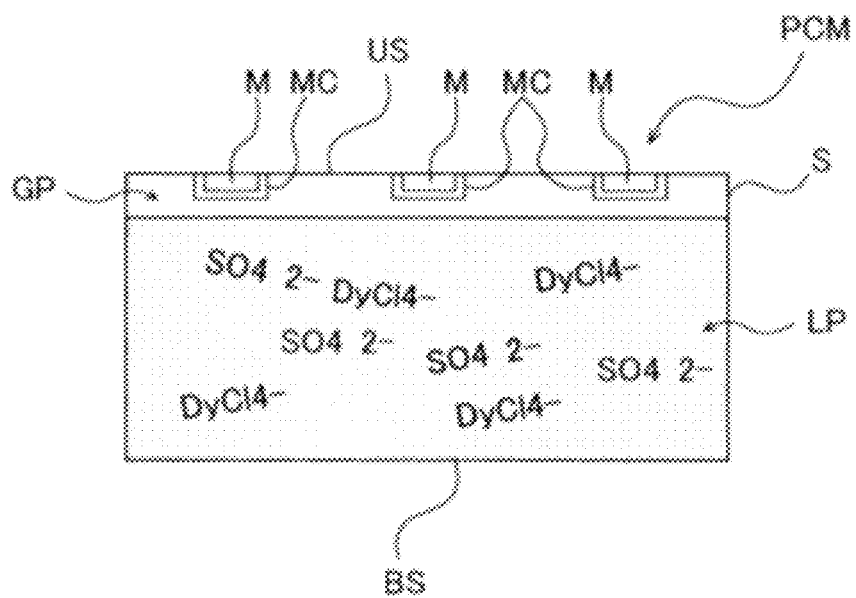
Figure 8B:
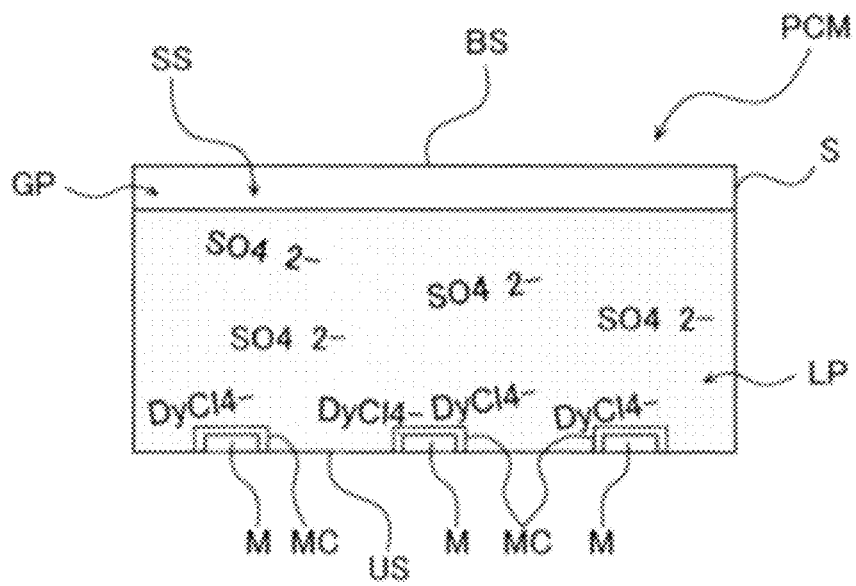
Figure 9A:
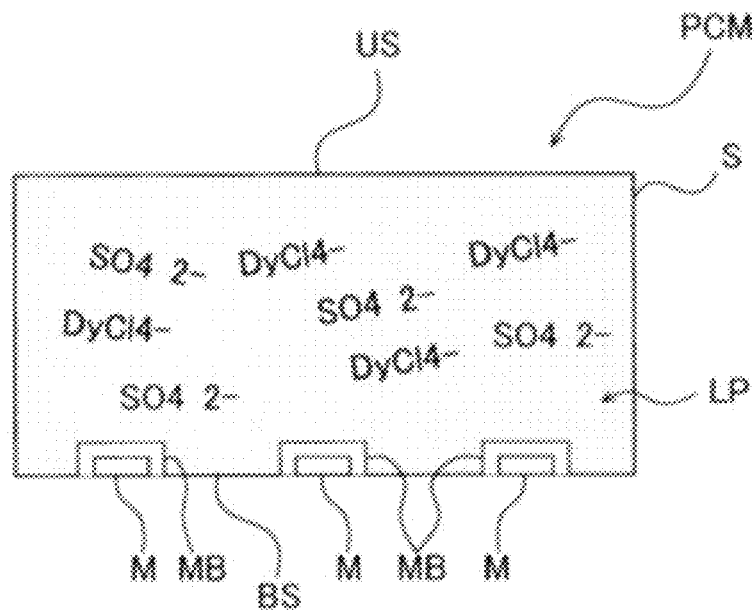
Figure 9B:
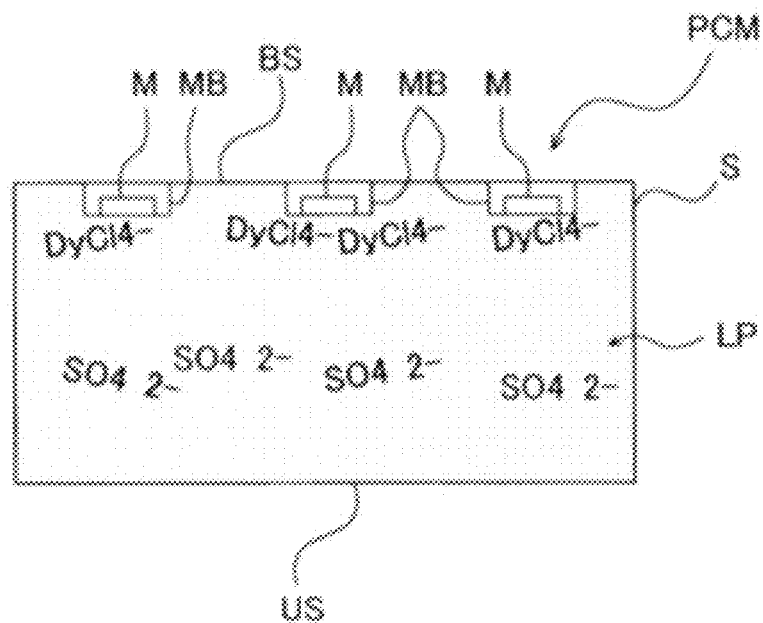

FIGS. 8A, 8B, 9A, and 9B are enlarged views illustrating one of the plurality of cells S according to the fourth embodiment, in which FIGS. 8A and 9A illustrate a non-rotated state and FIGS. 8B and 9B illustrate a rotated state. As illustrated in FIG. 8A, a magnet (uneven distribution unit and magnetic material) M is provided inside the cell S. The magnet M is housed in a magnet cover MC. The magnet cover MC is provided at a position biased in the height direction in the cell S (upper face US in FIG. 8), and is located in the gas phase GP in the non-rotated state illustrated in FIG. 8A. On the other hand, in the rotated state illustrated in FIG. 8B, the magnet cover MC (magnet M) is in a state of being immersed in the liquid phase LP.

As illustrated in FIG. 9A, the cell S may not have the gas phase GP inside. In this example, the magnet M is housed in a magnet case MB. The magnet case MB has a cavity inside and prevents the latent heat storage material PCM from entering the inside thereof. The magnet case MB is attached to the lower face BS. The magnet M is located on the side of the lower face BS of the magnet case MB in the non-rotated state illustrated in FIG. 9A, and is located on the side of the upper face US of the magnet case MB in the rotated state illustrated in FIG. 9B. The magnet case MB may be attached to the upper face US.

In the fourth embodiment, the latent heat storage material PCM has a component that has magnetism and is dispersed as a freezing point depressant. The freezing point depressant herein includes, for example, 1-butyl-3-methylimidazolium tetrachlorodisprosate, of a water-soluble magnetic ionic liquid having tetrachlorodisprosate as anion described in JP-A-2007-131608. Although such water-soluble ionic liquid is dispersed as an ionized ion in water, it is considered that anion ($DyCl_4^-$) and cation ($BMIM^+$) are kept close to each other, and for convenience, $DyCl_4^+$ having magnetism will be hereinafter described.

Next, function of the pivot window 1 according to the fourth embodiment will be described with reference to FIGS. 8A and 8B. In the example illustrated in FIGS. 8A and 8B, it is assumed that the latent heat storage material PCM is a magnetic type heat storage material in which $DyCl_4^-$ which is a freezing point depressant is added to $Na_2SO_4 \cdot 10H_2O$.

First, in the summer, the cell S is oriented as illustrated in FIG. 8A. That is, the magnet M is in a state of being located in the gas phase GP. Here, since the magnet M is located in the gas phase GP, a dysprosium tetrachloride ion ($DyCl_4^-$) is in a state of being dispersed in the liquid phase LP. Accordingly, the freezing point depressant is appropriately caused to act, whereby the freezing point of the latent heat storage material PCM in the cell S can be lowered to, for example, about 18° C., thereby making it possible to obtain the latent heat storage window for the summer that provides the temperature control effect of cooling the indoor side.

On the other hand, for example, in the winter, the laminated body L is half rotated in the vertical direction by using the rotation mechanism 40 as illustrated in FIG. 2 while maintaining the left and right positions of the laminated body L. In this case, the result is shown as illustrated in FIG. 8B. That is, since the magnet M is located in the liquid phase LP, the dysprosium tetrachloride ion ($DyCl_4^-$) is attracted to the magnet M and becomes a state of being concentrated in the vicinity of the magnet M. As a result, the concentration of the freezing point depressant becomes low at a portion other than the vicinity of the magnet M. Therefore, the freezing point of the latent heat storage material PCM in the cell S can be increased to, for example, about 26° C., thereby making it possible to obtain the latent heat storage window for the winter that provides the temperature control effect of heating the indoor side.

Function of the pivot window 1 according to the fourth embodiment will be described with reference to FIGS. 9A and 9B. Even in the example illustrated in FIGS. 9A and 9B, the latent heat storage material PCM is assumed to be the magnetic type heat storage material in which $DyCl_4^-$ which is the freezing point depressant is added to $Na_2SO_4 \cdot 10H_2O$.

First, in the summer, the cell S is oriented as illustrated in FIG. 9A. That is, the magnet case MB is located on the lower side in the cell S, and the magnet M is located on the lower side in the magnet case MB. At this time, the magnet M and the latent heat storage material PCM are in a state of being separated from each other by a distance of the cavity of the magnet case MB, and a magnetic force of the magnet M becomes difficult to reach the latent heat storage material PCM. Therefore, the dysprosium tetrachloride ion ($DyCl_4^-$) is in a state of being dispersed in the liquid phase LP. As a result, the freezing point depressant is appropriately caused to act, whereby the freezing point of the latent heat storage material PCM in the cell S can be lowered to, for example, about 18° C., thereby making it possible to obtain the latent heat storage window for the summer that provides the temperature control effect of cooling the indoor side.

On the other hand, in the winter, the laminated body L is half rotated in the vertical direction by using the rotation mechanism 40 as illustrated in FIG. 2 while maintaining the left and right positions of the laminated body L. In this case, the result is shown as illustrated in FIG. 9B. That is, the magnet case MB is located on the upper side in the cell S, and the magnet M is located on the lower side of the magnet case MB. At this time, a distance between the magnet M and the latent heat storage material PCM is equal to a thickness of the magnet case MB, and the magnetic force of the magnet M easily reaches the latent heat storage material PCM. Accordingly, the dysprosium tetrachloride ion ($DyCl_4^-$) is attracted to the magnet M and becomes a state of being concentrated in the vicinity of the magnet M. As a result, the concentration of the freezing point depressant becomes low at a portion other than the vicinity of the magnet M. Therefore, the freezing point of the latent heat storage material PCM in the cell S can be increased to, for example, about 26° C., thereby making it possible to obtain the latent heat storage window for the winter that provides the temperature control effect of heating the indoor side.

As described above, according to the pivot window 1 according to the fourth embodiment, in the same manner as that of the first embodiment, it is possible to suppress the deterioration in the heat storage amount due to the generation of the precipitate PR.

According to the fourth embodiment, since the magnet M for unevenly distributing the specific component is provided, an uneven distribution state of the component can be caused to be different before and after the half rotation in the vertical direction, thereby making it possible to change the melting point and the freezing point of the latent heat storage material PCM.

Since the magnet M is provided and the latent heat storage material PCM has a component such as dysprosium tetrachloride that has magnetism and is dispersed, it is possible to concentrate the component that has magnetism and is dispersed in the magnet M, thereby making it possible to change the melting point and the freezing point of the latent heat storage material PCM.

Next, a fifth embodiment of the present invention will be described. A pivot window according to the fifth embodiment has the following configuration. Hereinafter, in the description of the fifth embodiment, the same or similar elements as those of the first embodiment will be denoted by the same reference signs.

Figure 10:
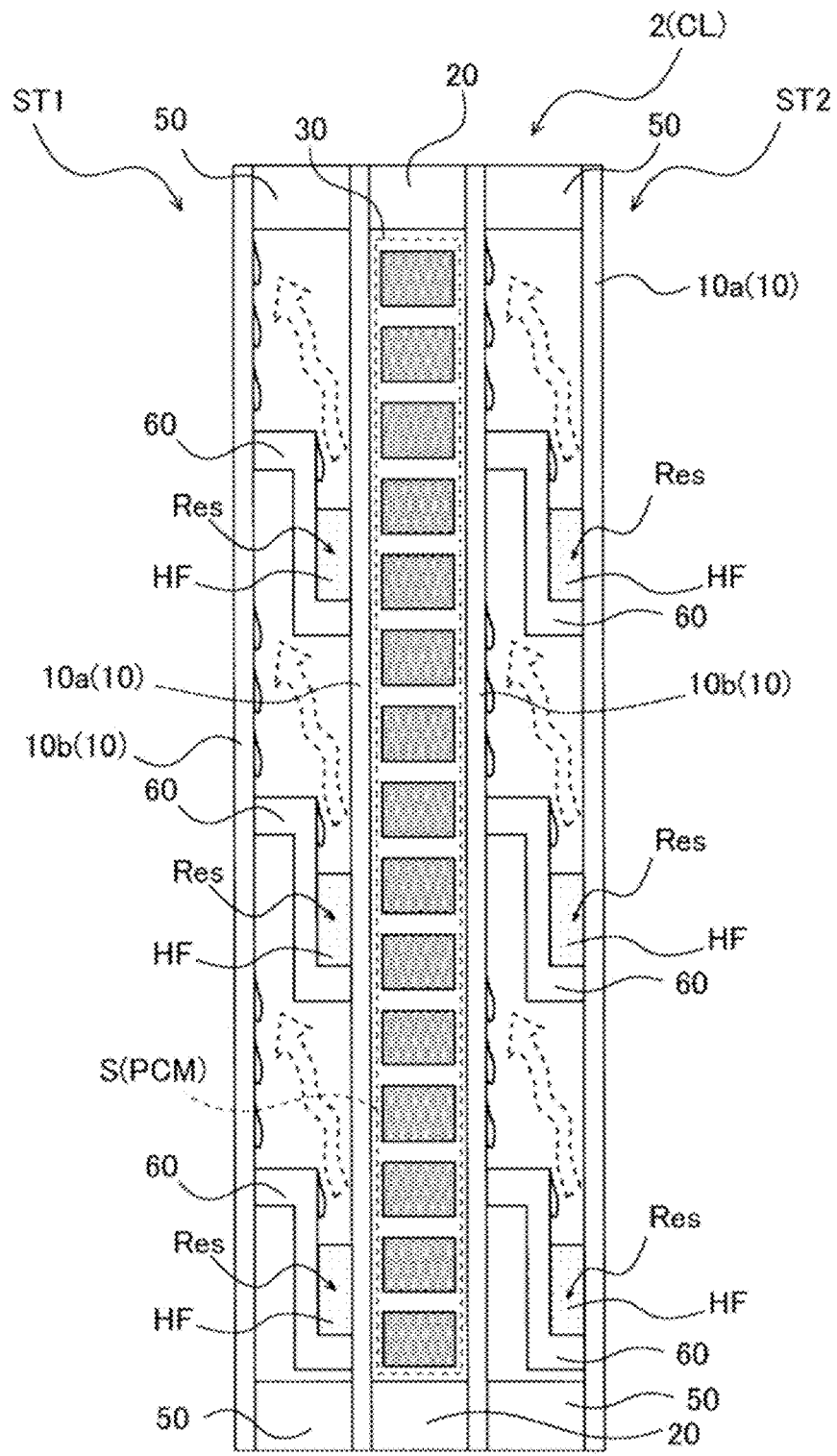
FIG. 10 is a cross-sectional view illustrating a pivot window according to a fifth embodiment.

FIG. 10 is a cross-sectional view illustrating a pivot window according to the fifth embodiment. As illustrated in FIG. 10, a pivot window 2 according to the fifth embodiment has a configuration in which the cell array plate material 30 and the peripheral end member 20 described in the first embodiment are sandwiched between first and second structures ST1 and ST2, and thus are interposed therebetween.

The first and second structures ST1 and ST2 respectively include a first plate material 10a and a second plate material 10b which are roughly two sheets of the plate material 10, a vacuum peripheral end member 50, slopes 60, and hydraulic fluid (liquid) HF.

The two sheets of the plate material 10 are transparent plate materials disposed almost in parallel with each other. These plate materials 10 are configured of, for example, a glass material that makes water vapor impermeable. The vacuum peripheral end member 50 is interposed between the two sheets of the plate material 10 at the peripheral end parts of the two sheets of the plate material 10. An internal space formed by the two sheets of the plate material 10 and the vacuum peripheral end member 50 is in a vacuum state from a viewpoint of heat insulation. The internal space is not limited to the vacuum state, but may be filled with a predetermined gas.

The slope 60 is a transparent member interposed between the two sheets of the plate material 10, and is folded at 90 degrees twice to form a bent body having an approximately N-shaped cross section in the cross-sectional view state illustrated in FIG. 10. In the slope 60, one end part 60a (which will be described later and refer to FIG. 11) is provided to be in contact with an inner wall of the first plate material (one plate material) 10a, and the other end part 60b (which will be described later and refer to FIG. 11) is provided to be in contact with an inner wall of the second plate material (the other plate material) 10b. The above-described slope 60 with the first plate material 10a on one end side configures a storage part Res that can store the hydraulic fluid HF together.

Figure 11:
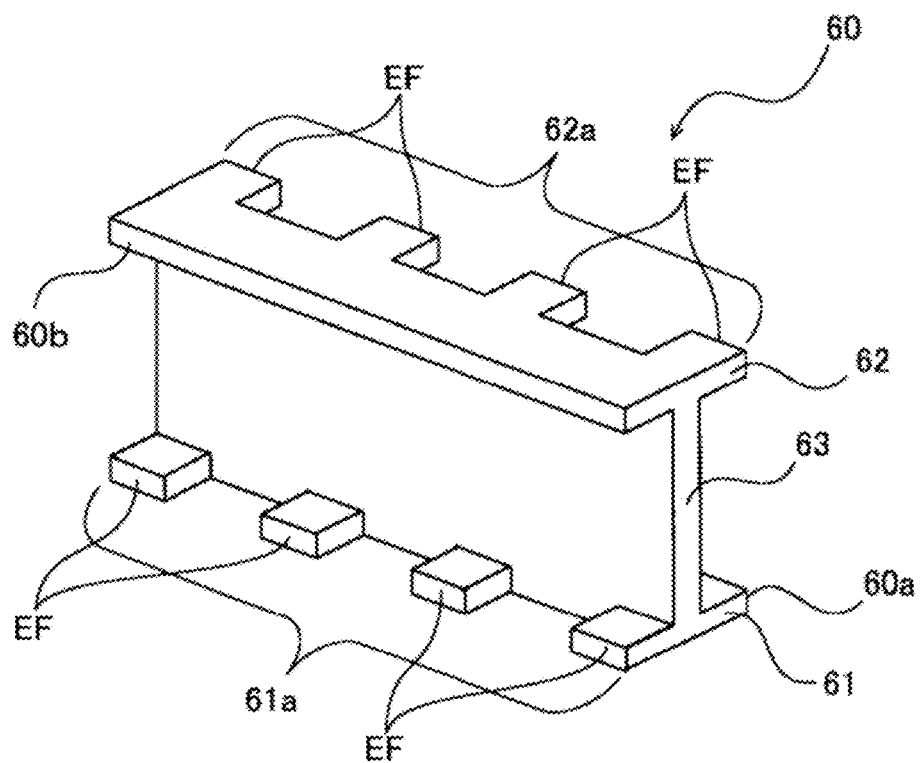
FIG. 11 is a perspective view illustrating details of a slope illustrated in FIG. 10.

FIG. 11 is a perspective view illustrating details of the slope 60 illustrated in FIG. 10. As illustrated in FIG. 10, the slope 60 includes a lower plate 61, an upper plate 62 disposed in parallel with the lower plate 61, and a connection plate 63 connecting the lower plate 61 and the upper plate 62.

The lower plate 61 has the above-described end part 60a, and the opposite side of the end part 60a is formed as a comb tooth part 61a protruding in a comb tooth shape. Each end face EF of the comb tooth part 61a becomes a portion that contacts the inner wall of the second plate material 10b. The upper plate 62 has a point symmetrical structure with the lower plate 61 with the connection plate 63 interposed therebetween. That is, the upper plate 62 is formed as a comb tooth part 62a protruding in a comb tooth shape on the side opposite to the end part 60b, and each end face EF of the comb tooth part 62a is a portion that contacts the inner wall of the first plate material 10a. In this manner, the opposite end parts (end part 60a and end face EF) of the lower plate 61 of the slope 60 and the opposite end parts (end part 60b and end face EF) of the upper plate 62 thereof respectively contact the two sheets of the plate material 10. Accordingly, the slope 60 supports the two sheets of the plate material 10 in the vacuum state from the inside thereof.

FIG. 10 is referred to again. In the embodiment, the hydraulic fluid HF is a transparent liquid such as water. The hydraulic fluid HF is not limited to water. The above-described hydraulic fluid HF is stored in the storage part Res. The hydraulic fluid HF in the storage part Res can be evaporated by heat from the first plate material 10a. The evaporated hydraulic fluid HF becomes steam and reaches the second plate material 10b. The hydraulic fluid HF becoming steam is condensed and liquefied in the second plate material 10b. The liquefied hydraulic fluid HF flows down the inner face of the second plate material 10b and accumulates on the upper plate 62 of the slope 60 (refer to FIG. 11). When a certain amount or more of the hydraulic fluid HF accumulates on the upper plate 62, the hydraulic fluid HF falls into the storage part Res from a gap between the comb tooth parts 62a of the upper plate 62. Here, the first plate material 10a functions as an evaporator because the hydraulic fluid HF is evaporated, and the second plate material 10b functions as a condenser because the hydraulic fluid HF is condensed. Accordingly, the side of the first plate material 10a is cooled by being deprived of the evaporation heat, and condensation heat is discarded from the side of the second plate material 10b.

In the above-described pivot window 2, the water (hydraulic fluid HF) is evaporated at a temperature of, for example, 21° C. or higher in the first plate material 10a of the second structure ST2. When the evaporated water (steam) touches the second plate material 10b, the evaporated water is cooled and liquefied, and returns to the storage part Res via the upper plate 62 of the slope 60. In this process, the side of the first plate material 10a is cooled by being deprived of the evaporation heat, and the condensation heat is discarded from the side of the second plate 10b. The condensation heat discarded from the side of the second plate material 10b is stored by the latent heat storage material PCM.

When the temperature on the side of the second plate material 10b of the first structure ST1 becomes lower than 21° C., the hydraulic fluid HF is evaporated in the storage part Res on the side of the first structure body ST1 by the heat stored in the latent heat storage material PCM, and the condensation heat is discarded from the side of the second plate material 10b.

As a result, the heat on the side of the second structure ST2 flows through the side of the first structure ST1 through the latent heat storage material PCM serving as a buffer. Accordingly, for example, in the summer, the indoor side becomes the second structure ST2, thereby making it possible to obtain a temperature control effect of coaling the indoor side without taking in moisture.

Particularly, the pivot window 2 according to the fifth embodiment can obtain a cooling effect by using the latent heat storage material PCM, when the room temperature is, for example, equal to or higher than 21° C. even though the outside air temperature is high. That is, since the latent heat storage material PCM is fixed at 21° C., indoor heat can be transferred to the latent heat storage material PCM when the room temperature is equal to or higher than 21° C., such that the cooling effect can be obtained indoors. For example, the heat stored in the latent heat storage material PCM is discarded when the outside air temperature at night becomes equal to or lower than 21° C. Accordingly, the pivot window 2 is provided with the latent heat storage material PCM as the buffer, thereby making it possible to increase the frequency of performing indoor comfort.

In the pivot window 2, the slope 60 forms the storage part Res together with the first plate material 10a, but a heat transfer member may be attached to the inner face of the first plate material 10a, and the storage part Res may be turned together with the heat transfer member. That is, the slope 60 may form the storage part Res on the side of the first plate material 10a together with other members. In the embodiment, the hydraulic fluid HF reaches the second plate material 10b and is condensed and liquefied, but the embodiment is not limited thereto, and the heat transfer member may be attached to the inner face of the second plate material 10b so that the hydraulic fluid HF may reach the heat transfer member and may be condensed and liquefied.

When the slope 60 has a liquid circulation structure that circulates the hydraulic fluid HF, the structure is not limited to the structure illustrated in FIG. 11, and for example, may be a simple inclined structure (inclined structure inclined from the end part 60a toward the end part 60b).

The first plate material 10a may be a heat absorbing glass (glass containing metal such as iron in a glass composition) for improving evaporation ability. At least one inner face of the two sheets of the plate material 10 may be subjected to an infrared ray reflection treatment in order to improve heat insulation property during heat insulation.

Figure 12:
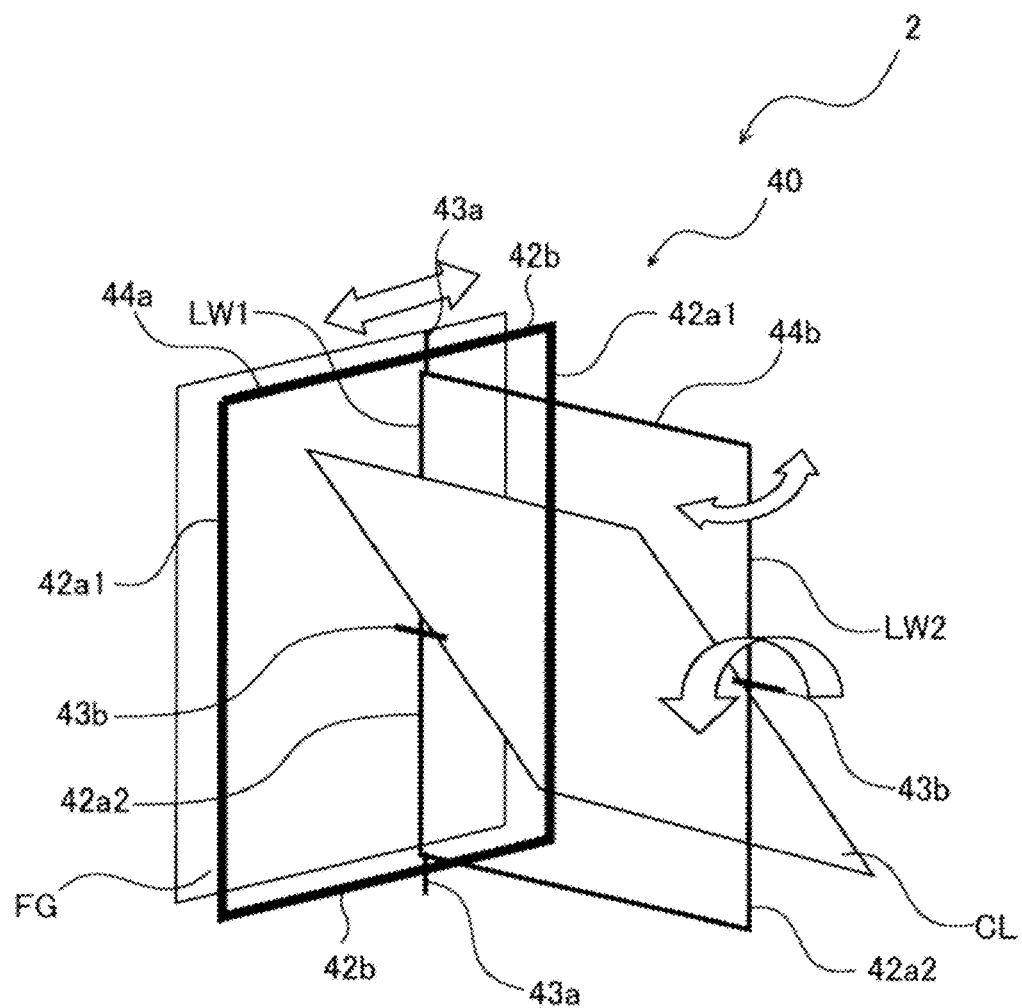
FIG. 12 is a perspective view illustrating the pivot window according to the fifth embodiment, and illustrates a rotation mechanism.

The pivot window 2 according to the fifth embodiment includes the rotation mechanism 40 as illustrated in FIG. 12, and is rotatable not only in the vertical direction but also in the horizontal direction orthogonal to the vertical direction.

FIG. 12 is a perspective view illustrating the pivot window 2 according to the fifth embodiment, and illustrates the rotation mechanism 40. In the example illustrated in FIG. 12, a configuration of the pivot window 2 excluding the rotation mechanism 40 (first and second structures ST1 and ST2, peripheral end member 20, and cell array plate material 30) is referred to as a composite laminated body (flat body) CL.

As illustrated in FIG. 12, the pivot window 2 according to the fifth embodiment further includes a fixed glass FG on the outdoor side. Therefore, the pivot window 2 illustrated in FIG. 12 is configured to be able to perform half rotation in the vertical and horizontal directions without causing the composite laminated body CL to contact the fixed glass FG.

In the example illustrated in FIG. 12, the rotation mechanism 40 includes a first pivot 43a, a second pivot 43b, a first window frame 44a, a second window frame 44b, and first and second lock units which are not illustrated.

The first window frame 44a is a rectangular frame fixed to the building side. The second window frame 44b is provided with the first pivot 43a at any one of left and right end parts LW1, and the first pivot 43a is slidable with respect to upper and lower members 42b of the first window frame 44a. The second pivot 43b is attached to an intermediate part in the height direction of the composite laminated body CL, and is rotatably provided at a central part of left and right members 42a2 of the rectangular second window frame 44b.

Therefore, the rotation operation can be performed as follows. First, it is assumed that the end part LW1 on the side of the first pivot 43a of the second window frame 44b is located on one of left and right members 42a1 of the first window frame 44a. From this state, the first lock unit is released, and an end part LW2 of the second window frame 44b on the side where the first pivot 43a is not provided is drawn out to the indoor side. Next, the second lock unit is released, and the composite laminated body CL is half rotated in the vertical direction centering on the second pivot 43b. Next, the composite laminated body CL is locked by the second lock unit. Next, the end part LW1 on the side of the first pivot 43a of the second window frame 44b is slid to the other side of the left and right members 42a1 of the first window frame 44a. Thereafter, the second window frame 44b is fitted into the first window frame 44a so that the end part LW2 of the second window frame 44b becomes one side of the left and right members 42a1, and is locked by the first lock unit.

As described above, in the pivot window 2 including the fixed glass FG on the outdoor side, the composite laminated body CL is rotatable in both vertical and horizontal directions.

As illustrated in FIG. 11, in the slope 60, since the shapes of the lower plate 61 and the upper plate 62 have the point symmetrical structure with the connection plate 63 interposed therebetween, the slope 60 forms the storage part Res even when the composite laminated body CL is half rotated in the vertical direction. That is, when the composite laminated body CL is half rotated in the vertical direction, the storage part Res is formed by the upper plate 62 and the second plate material 10b.

Next, function of the pivot window 2 according to the fifth embodiment will be described. First, as illustrated in FIG. 10, the first plate material 10a of the second structure ST2 becomes the indoor side, and the second plate material 10b of the first structure ST1 becomes the outdoor side.

In this state, for example, when the room temperature becomes equal to or higher than 21° C., the hydraulic fluid HF in the storage part Res is evaporated. The evaporated hydraulic fluid HF reaches the second plate material 10b on the outdoor side to be liquefied and flows down the inner face of the second plate material 10b. The flowing hydraulic fluid HF returns to the storage part Res again via the upper plate 62 of the slope 60. In this process, the first plate material 10a is cooled by the evaporation heat generated by the evaporation of the hydraulic fluid HF, and the condensation heat of the hydraulic fluid HF is discarded from the second plate material 10b. The discarded heat is stored by the latent heat storage material PCM. Accordingly, the indoor side heat can be transferred to the latent heat storage material PCM, thereby making it possible to provide an air conditioning effect of cooling the indoor side.

With respect to the first structure ST1, when the outside air temperature is equal to or lower than 21° C., the hydraulic fluid HF repeats evaporation and condensation in the same manner as described above, such that the heat stored in the latent heat storage material PCM is discarded to the outside air.

When the composite laminated body CL is rotated in the horizontal direction while maintaining the vertical position of the composite laminated body CL by using the rotation mechanism 40 as illustrated in FIG. 12, an operation is reverse to the above description, and an air conditioning effect of heating the indoor side in the winter can be obtained. When the composite laminated body CL is rotated in the vertical and horizontal directions by using the rotation mechanism 40, an effect of breaking the precipitate PR of the latent heat storage material PCM is further obtained, thereby recovering the heat storage amount.

According to the pivot window 2 according to the fifth embodiment, in the same manner as that of the first embodiment, it is possible to suppress the deterioration in the heat storage amount due to the generation of the precipitate PR.

The pivot window 2 according to the fifth embodiment includes the first and second structures ST1 and ST2 including the two sheets of the plate material 10, the storage part Res of the hydraulic fluid HF and the slope 60, and the cell array plate 30 is interposed therebetween. Therefore, first, when the hydraulic fluid HF is evaporated due to the heat on the side of the first plate material 10a of the second structure ST2, the side of the first plate material 10a is cooled by being deprived of the evaporation heat. On the other hand, when the evaporated hydraulic fluid HF reaches the side of the second plate material 10b, the evaporated hydraulic fluid HF is cooled to be condensed and liquefied, and the condensation heat is discarded from the side of the second plate material 10b. The same also applies to the first structure ST1. Therefore, the cooling effect can be provided in the indoor side.

Here, when one structure is used as a fitting, as long as a temperature environment of both of the side of one plate material 10a and the side of the other plate material 10b of the structure is not adjusted, the heat does not flow from the side of one plate material 10a to the side of the other plate material 10b. However, since the pivot window 2 according to the fifth embodiment includes the cell array plate material 30 between the first and second structures ST1 and ST2, it is considered that the latent heat storage material PCM is provided as the buffer, and the temperature of the latent heat storage material PCM is kept constant. Therefore, for example, even though the outside air temperature is higher than the room temperature, the indoor heat can be transferred to the latent heat storage material PCM when the room temperature is equal to or higher than a specified temperature range, and the heat of the latent heat storage material PCM can be discarded to the outside air when the outside becomes cooler than a specific temperature range such as at night. As described above, the latent heat storage material PCM is provided as the buffer, thereby making it possible to increase the frequency of performing indoor comfort.

Since the rotation mechanism 40 is configured to be capable of performing at least half rotation in the horizontal direction, the rotation mechanism 40 is rotated in the horizontal direction when it is desired to change a direction of heat flow such as the summer and the winter, and day and night, whereby cooling or heating the indoor side can be selected.

As described above, while the present invention is described based upon the embodiments, the present invention is not limited to the above-described embodiments, modifications may be made within a range not departing from the spirit of the present invention, and technologies of different embodiments may be appropriately combined within a possible range. Further, publicly known or well-known technologies may be combined within a possible range.

For example, in the embodiments, the rotation mechanism 40 illustrated in FIGS. 2 and 10 is shown, and the rotation mechanism 40 is not limited to the illustrated one. The pivot window 1 according to each of the first to third embodiments may be able to perform half rotation in the horizontal direction.

The pivot window 2 according to the fifth embodiment may be provided with a spray unit for spraying mist-like moisture. For example, when the mist-like moisture is sprayed on the second plate material 10b of the first structure ST1 in the state illustrated in FIG. 10, an effect of lowering the second plate material 10b to near a dew point can be obtained even though the outside air temperature is high. As a result, a state similar to that when the outside air temperature becomes artificially lowered is created, thereby making it possible to allow the heat on the side of the latent heat storage material PCM to flow outdoors. Spraying may be performed when the first structure ST1 is located on the indoor side by the horizontal rotation of the rotation mechanism 40.

In the pivot window 2 according to the fifth embodiment, while the configuration in which the structures ST1 and ST2 are provided on the opposite sides of the cell array plate material 30 is described, the configuration is not limited thereto, and may have one structure ST1 or ST2 on only one side.

In the above description, the component of the latent heat storage material PCM (component having magnetism) may be not only a component that generates latent heat, and a melting point·freezing point regulator; but also a dispersant and a nucleating agent, for example.

What is claimed is:

1. A rotary fitting comprising:
a cell array plate material including a plurality of cells respectively encapsulating a latent heat storage material; and
a rotation mechanism for causing the cell array plate material to perform at least a half rotation in a vertical direction,
wherein the latent heat storage material includes two or more components,
the plurality of cells includes an uneven distribution unit for unevenly distributing a specific component of the two or more components by a half rotation of the plurality of cells in the vertical direction,
the rotary fitting further comprises a magnetic material provided at a position biased in the height direction in the plurality of cells as the uneven distribution unit, and
the latent heat storage material includes a component that has magnetism and is dispersed.

2. A rotary fitting comprising:
a cell array plate material including a plurality of cells respectively encapsulating a latent heat storage material;
a rotation mechanism for causing the cell array plate material to perform at least a half rotation in a vertical direction; and
first and second structures respectively including
two sheets of a plate material that form a space sandwiched between the two sheets of the plate material,
liquid that is encapsulated between the two sheets of the plate material, and
a slope that forms a liquid circulation structure in which a storage part of the liquid is formed on one plate material side of the two sheets of the plate material, the liquid in the storage part being configured to be evaporated by heat of the one plate material side and reach the other plate material side, and the liquid being configured to be condensed on the other plate material side and be returned to the storage part, wherein
the cell array plate material is interposed between the first and second structures,
the one plate material of the first structure and the other plate material of the second structure face each other, and
the rotation mechanism is configured to cause the cell array plate material together with the first and second structures to perform at least the half rotation in the vertical direction.

3. The rotary fitting according to claim 2, wherein
the rotation mechanism is configured to cause the cell array plate material together with the first and second structures to perform at least a half rotation in a horizontal direction orthogonal to the vertical direction.

4. A rotary fitting comprising:
a cell array plate material including a plurality of cells respectively encapsulating a latent heat storage material; and
a rotation mechanism for causing the cell array plate material to perform at least half rotation in a vertical direction,
wherein the latent heat storage material includes two or more components,
the plurality of cells includes an uneven distribution unit for unevenly distributing a specific component of the two or more components by a half rotation of the plurality of cells in the vertical direction,
the rotary fitting further comprises a first membrane, as the uneven distribution unit, that is provided at a position biased in a height direction in a cell of the plurality of cells and separates an inside of the cell into a small space and a main space, and
the first membrane has a different permeation speed of a specific ion from a permeation speed of another ion, or a different permeation speed of an ion from a permeation speed of water.

5. The rotary fitting according to claim 4, the rotary fitting further comprising:
a second membrane, as the uneven distribution unit, that forms a second small space substantially symmetrical to the small space in the height direction in the main space in the cell, wherein
the second membrane is configured by the same material as that of the first membrane.

* * * * *